United States Patent
Liu et al.

(10) Patent No.: US 11,580,445 B2
(45) Date of Patent: Feb. 14, 2023

(54) EFFICIENT OFF-POLICY CREDIT ASSIGNMENT

(71) Applicant: salesforce.com, inc., San Francisco, CA (US)

(72) Inventors: Hao Liu, San Francisco, CA (US); Richard Socher, Menlo Park, CA (US); Caiming Xiong, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 609 days.

(21) Appl. No.: 16/653,890

(22) Filed: Oct. 15, 2019

(65) Prior Publication Data
US 2020/0285993 A1   Sep. 10, 2020

Related U.S. Application Data

(60) Provisional application No. 62/852,258, filed on May 23, 2019, provisional application No. 62/849,007, filed on May 16, 2019, provisional application No. 62/813,937, filed on Mar. 5, 2019.

(51) Int. Cl.
*G06N 20/00* (2019.01)
*G06N 5/02* (2006.01)

(52) U.S. Cl.
CPC ............ *G06N 20/00* (2019.01); *G06N 5/02* (2013.01)

(58) Field of Classification Search
CPC .............................. G06N 20/00; G06N 5/02
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 10,792,810 B1* | 10/2020 | Beckman | B25J 9/163 |
| 2016/0350653 A1 | 12/2016 | Socher et al. | |
| 2017/0024645 A1 | 1/2017 | Socher et al. | |
| 2017/0031361 A1* | 2/2017 | Olson | B60W 50/0097 |
| 2017/0032280 A1 | 2/2017 | Socher | |
| 2017/0140240 A1 | 5/2017 | Socher | |
| 2018/0082171 A1 | 3/2018 | Merity et al. | |
| 2018/0096219 A1 | 4/2018 | Socher | |

(Continued)

FOREIGN PATENT DOCUMENTS

WO   2018083532 A1   11/2018

OTHER PUBLICATIONS

Liang, Chen, et al. "Memory augmented policy optimization for program synthesis and semantic parsing." Advances in Neural Information Processing Systems 31 (2018). (Year: 2018).*

(Continued)

*Primary Examiner* — Kevin W Figueroa
(74) *Attorney, Agent, or Firm* — Haynes and Boone LLP

(57) ABSTRACT

Systems and methods are provided for efficient off-policy credit assignment (ECA) in reinforcement learning. ECA allows principled credit assignment for off-policy samples, and therefore improves sample efficiency and asymptotic performance. One aspect of ECA is to formulate the optimization of expected return as approximate inference, where policy is approximating a learned prior distribution, which leads to a principled way of utilizing off-policy samples. Other features are also provided.

18 Claims, 9 Drawing Sheets

(56) References Cited

U.S. PATENT DOCUMENTS

| | | | |
|---|---|---|---|
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0268287 | A1 | 9/2018 | Johansen et al. |
| 2018/0268298 | A1 | 9/2018 | Johansen et al. |
| 2018/0300317 | A1 | 10/2018 | Bradbury |
| 2018/0300400 | A1 | 10/2018 | Paulus |
| 2018/0336198 | A1 | 11/2018 | Zhong et al. |
| 2018/0336453 | A1 | 11/2018 | Merity et al. |
| 2018/0349359 | A1 | 12/2018 | McCann et al. |
| 2018/0373682 | A1 | 12/2018 | McCann et al. |
| 2018/0373987 | A1 | 12/2018 | Zhang et al. |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |
| 2019/0188568 | A1 | 6/2019 | Keskar et al. |
| 2019/0213482 | A1 | 7/2019 | Socher et al. |
| 2019/0251168 | A1 | 8/2019 | McCann et al. |
| 2019/0251431 | A1 | 8/2019 | Keskar et al. |
| 2019/0258714 | A1 | 8/2019 | Zhong et al. |
| 2019/0258939 | A1 | 8/2019 | Min et al. |
| 2019/0286073 | A1 | 9/2019 | Asl et al. |
| 2019/0295530 | A1 | 9/2019 | Asl et al. |
| 2019/0311002 | A1 | 10/2019 | Paulus |
| 2021/0237266 | A1* | 8/2021 | Kalashnikov .......... B25J 9/1697 |

OTHER PUBLICATIONS

Abolafia et al., "Neural Program Synthesis with Priority Queue Training," arXiv preprint arXiv:1801.03526, 2018, pp. 1-16.

Agarwal et al., "Learning to Generalize from Sparse and Underspecified Rewards," arXiv preprint arXiv: 1902.07198v4, Proceedings of the 36th International Conference on Machine Learning, Long Beach, California, PMLR 97, 2019, Copyright 2019, pp. 1-14.

Ali et al., "A General Class of Coefficients of Divergence of One Distribution from Another," Journal of the Royal Statistical Society: Series B (Methodological), 28(1):131-142.

Andrychowicz et al, "Hind-Sight Experience Replay," Submitted in 31st Conference on Neural Information Processing Systems (NIPS 2017), Long Beach, CA, USA, pp. 1-11.

Artzi et al., "Weakly Supervised Learning of Semantic Parsers for Mapping Instructions to Actions," Transactions of the Association for Computational Linguistics, 2013, pp. 1-14.

Balog et al., "Deepcoder: Learning to Write Programs," Under Review as a Conference Papaer at ICLR 2017, arXiv preprintarXiv:1611. 01989, 2016 pp. 1-19.

Berant et al., "Semantic Parsing on Free-Base from Question-Answer Pairs," in Proceedings of the 2013 Conference on Empirical Methods in Natural Language Processing, pp. 1533-1544.

Bunel et al., "Leveraging Grammar and Reinforcement Learning for Neural Program Synthesis," Published as a Conference Paper at ICLR 2018, arXiv preprint arXiv:1805.04276v2, 2018.

Burkett et al., "Variational Inference for Structured NLP Models," in Proceedings of the 51st Annual Meeting of the Association for Computational Linguistics, Sofia, Bulgaria, Aug. 4-9, 2013. Copyright 2013 Association for Computational Linguistics, pp. 9-10.

Clarke et al., "Driving Semantic Parsing from the World's Response," in Proceedings of the Fourteenth Conference on Computational Natural Language Learning, Uppsala, Sweden Jul. 15-16, 2019, Association for Computational Linguistics, pp. 18-27.

Dempster et al., "Maximum Likelihood from Incomplete Data via the em Algorithm," Journal of the Royal Statistical Society: Series B (Methodological), 39(1):1-22.

Dong et al., "Coarse-to-Fine Decoding for Neural Semantic Parsing," 2018, arXiv preprint ar Xiv: 1805. 04793, pp. 1-12.

Espeholt et al., "Impala: Scalable Distributed Deep-RL with Importance Weighted Actor-Learner Architectures," 2018, arXiv preprint arXiv:1802.01561, pp. 1-22.

Guu et al., "From Language to Pro-Grams: Bridging Reinforcement Learning and Maximum Marginal Likelihood," arXiv preprint ar Xiv: 1704. 07926, 2017, pp. 1-12.

Haarnoja et al., "Soft Actor-Critic: Off-Policy Maximum Entropy Deep Reinforcement Learning with a Stochastic Actor," in Dy, J. and Krause, A. (eds.), Proceedings of the 35th International Conference on Machine Learning, vol. 80 of Proceedings of Machine Learning Research, Stockholm, Sweden, PMLR 80, Jul. 10-15, 2018, pp. 1861-1870.

Haug et al., "Neural Multi-Step Reasoning for Question Answering on Semi-Structured Tables," in European Conference on Information Retrieval, Springer 2018, pp. 611-617.

Hoffman et al., "Stochastic Variational Inference," The Journal of Machine Learning Research, 14(1):1303-1347.

Huang et al., "Natural Language to Structured Query Generation via Meta-Learning," arXiv preprint arXiv:1803.02400, 2018, pp. 1-9.

Jaderberg et al., "Decoupled Neural Interfaces using Synthetic Gradients," in Proceedings of the 34th International Conference on Machine Learning, Sydney, Australia, PMLR 70, 2017 pp. 1627-1635.

Jordan et al., "An Introduction to Variational Methods for Graphical Models," Machine learning, 1999, 37(2):183-233.

Kingma et al., "Adam: A Method for Stochastic Optimization," Under Review as a Conference Paper at ICLR 2015, arXiv preprint arXiv:1412.6980, 2014, pp. 1-9.

Krishnamurthy et al., "Neural Semantic Parsing with Type Constraints for Semi-Structured Tables," in Proceedings of the 2017 Conference on Empirical Methods in Natural Language Processing, 2017, pp. 1516-1526.

Krishnamurthy et al., "Weakly Supervised Training of Semantic Parsers," in Proceedings of the 2012 Joint Conference on Empirical Methods in Natural Language Processing and Computational Natural Language Learning, Association for Computational Linguistics, pp. 754-765.

Liang et al., "Neural Symbolic Machines: Learning Semantic Parsers on Freebase with Weak Supervision," arXiv preprint arXiv:1611. 00020, 2016, pp. 1-10.

Liang et al., "Memory Augmented Policy Optimization for Program Synthesis with Generalization," arXiv preprint arXiv:1807.02322, 2018, pp. 1-15.

Liang et al., "Learning Dependency-Based Compositional Semantics," Computational Linguistics, 39(2):389-446, accepted for publication: Apr. 18, 2012.

Lin et al., "Nl2bash: A Corpus and Semantic Parser for Natural Language Interface to the Linux Operating System," in Proceedings of the Eleventh International Conference on Language Resources and Evaluation LREC 2018, Miyazaki (Japan), May 7-12, 2018, pp. 1-12.

McCann et al., "The Natural Language Decathlon: Multitask Learning as Question Answering," arXiv preprint arxiv:1806.08730, 2018, pp. 1-23.

Mnih et al., "Asynchronous Methods for Deep Reinforcement Learning," Proceedings of the 33rd International Conference on Machine Learning, New York, NY, USA, 2016. JMLR: W&CP vol. 48. Copyright 2016, pp. 1928-1937.

Morimoto et al., 1963. Markov processes and the h-theorem. Journal of the Physical Society of Japan, 18(3):328-331.

Mudrakarta et al., "It was the Training Data Pruning Too!," arXiv preprint arXiv:1803.04579, 2018, pp. 1-3.

Nachum et al., "Bridging the Gap Between Value and Policy Based Reinforcement Learning," 31st Conference on Neural Information Processing Systems (NIPS 2017), Long Beach, CA, USA, pp. 1-21.

Neelakantan et al., "Learning a Natural Language Interface with Neural Programmer," Under Review as a Conference Paper at ICLR 2017, arXiv preprint arXiv:1611.08945, 2016, pp. 1-10.

(56) References Cited

OTHER PUBLICATIONS

Norouzi et al., "Reward Augmented Maximum Likelihood for Neural Structured Prediction," in Advances in Neural Information Processing Systems, 2016, pp. 1723-1731.
Nowozin et al., "f-gan: Training Generative Neural Samplers using Variational Divergence Minimization," 30th Conference on Neural Information Processing Systems (NIPS 2016), Barcelona, Spain, 2016, pp. 1-9.
Pasupat et al., "Compositional Semantic Parsing on Semi-Structured Tables," arXiv preprint arXiv:1508.00305, 2015, pp. 1-11.
Rubin et al., Trading Value and Information in MDPs, in Decision Making with Imperfect Decision Makers, pp. 1-16.
Schulman et al., "Equivalence Between Policy Gradients and Soft Q-Learning," arXiv preprint arXiv:1704.06440, 2017, pp. 1-15.
Si et al., "Learning a Meta-Solver for Syntax-Guided Program Synthesis," Published as a Conference Paper at ICLR 2019, pp. 1-11.
Sun et al., "Semantic Parsing with Syntax- and Table-Aware SQL Generation," Proceedings of the 56th Annual Meeting of the Association for Computational Linguistics (Long Papers), Melbourne, Australia, Jul. 15-20, 2018, pp. 361-372.
Sutton et al., "Policy Gradient Methods for Reinforcement Learning with Function Approximation," in Advances in neural information processing systems, 2000, pp. 1057-1063.
Wainwright et al., "Graphical Models, Exponential Families, and Variational Inference," Foundations and Trends® in Machine Learning, 2008, 1(1-2):1-305.
Wang et al., "Poining out SQL Queries from Text," 2018a, pp. 1-12.
Wang et al., "Variational Inference with Tail-Adaptive f-Divergence," in 32nd Conference on Neural Information Processing Systems (NeurIPS 2018), Montreal, Canada., pp. 1-11.
Williams, "Simple Statistical Gradient-Following Algorithms for Connectionist Reinforcement Learning," Machine Learning, 1992, 8(3-4):229-256.
Williams et al., "Function Optimization using Connectionist Reinforcement Learning Algorithms," Connection Science, 3(3):241-268.
Xu et al., "Sqlnet: Generating Structured Queries from Natural Language without Reinforcement Learning," 2017 arXiv preprint arXiv:17II.04436, pp. 1-13.
Xu et al., "Meta-Gradient Reinforcement Learning," 32nd Conference on Neural Information Processing Systems (NeurIPS 2018), Montréal, Canada, 2018, pp. 1-12.
Yu et al., "TypeSQL: Knowledge-Based Type-Aware Neural Text-to-SQL Generation," arXiv preprint arXiv:1804.09769, 2018, pp. 1-7.
Zaremba et al., "Reinforcement Learning Neural Turing Machines," arXiv preprint arXiv:1505.00521, 2015, pp. 1-13.
Anonymous, "Guided Adaptive Credit Assignment for Sample Efficient Policy Optimization," Sep. 25, 2019, Retrieved from the Internet: URL:https://openreview.net/pdf?id=SyxBgkBFPS, pp. 1-18.
Liang, "Memory Augmented Policy Optimization for Program Synthesis and Semantic Parsing," 32nd Conference on Neural Information Processing Systems, Montreal, Canada, pp. 1-13, 2018.
International Search Report and Written Opinion from PCT/US2020/019493, dated Jun. 15, 2020, pp. 1-12.
Zelle et al., "Learning to Parse Database Queries Using Inductive Logic Programming," in Proceedings of the National Conference on Artificial Intelligence, 1996, pp. 1050-1055.
Zettlemoyer et al., "Learning to Map Sentences to Logical Form: Structured Classification with Probabilistic Categorial Grammars," arXiv preprint arXiv:1207.1420, 2012, pp. 1-9.
Zhang et al., "Macro Grammars and Holistic Triggering for Efficient Semantic Parsing," arXiv preprint arXiv:1707.07806, 2017, pp. 1-14.
Zhong et al., "Seq2SQL: Generating Structured Queries from Natural Language using Reinforcement Learning," 2017, arXivpreprint arXiv:1709.00103, pp. 1-13.
Ziebart, "Modeling Purposeful Adaptive Behavior with the Principle of Maximum Causal Entropy," Machine Learning Department School of Computer Science Carnegie Mellon University Pittsburgh, PA 15213, 2010 Copyright, pp. 1-236.
Ziebart et al, "Maximum Entropy Inverse Reinforcement Learning," Proceedings of the Twenty-Third AAAI Conference on Artificial Intelligence (2008) vol. 8, pp. 1433-1438. Chicago, IL, USA.
Andrychowicz et al., "Learning Dexterous in-Hand Manipulation," arXiv preprint arXiv:1808.00177, 2018, pp. 1-11.
Baker et al., "Designing Neural Network Architectures using Reinforcement Learning," International Conference on Learning Representations, Published as a Conference Paper at ICLR 2017, pp. 18.
Burda et al., "Exploration by Random Network Distillation," in International Conference on Learning Representations, 2019, pp. 1-17.
Cover et al., Elements of Information Theory, Copyright 1991, John Wiley-Sons, 2012, pp. 1-563.
Gangwani et al., "Learning Self-Imitating Diverse Policies," arXiV: 1805.10309v2, Published as a Conference Paper at ICLR 2019, pp. 1-18.
Grathwohl et al., "Backpropagation through the Void: Optimizing Control Variates for Black-Box Gradient Estimation," arXiv preprint arXiv:1711.00123, 2017, pp. 1-19.
Gu et al., "Deep Reinforcement Learning for Robotic Manipulation with Asynchronous Off-Policy Updates," in 2017 IEEE international conference on robotics and automation (JCRA), pp. 3389-3396. IEEE, 2017.
Ke et al., Sparse attentive backtracking: Temporal credit assignment through reminding. In Advances in Neural Information Processing Systems, 32nd Conference on Neural Information Processing Systems (NeurIPS 2018), Montréal, Canada, pp. 1-12.
Levine, "Reinforcement Learning and Control as Probabilistic Inference: Tutorial and Review," arXiv preprint arXiv:1805.00909, 2018, pp. 1-22.
Li et al., "Deep Reinforcement Learning for Dialogue Generation," arXiv preprint arXiv: 1606.01541, 2016, pp. 1-10.
Liu et al., "Action-Depedent Control Variates for Policy Optimization via Stein's Identity," Published as a Conference Paper at ICLR 2018, arXiv preprint arXiv:1710.11198, 2018, pp. 1-16.
Liu et al, "Competitive Experience Replay," Published as a Conference Paper at ICLR 2019, arXiv preprint arXiv:1902.00528, 2019, pp. 1-16.
Pathak et al., "Curiosity-Driven Exploration by Self-Supervised Prediction," in Proceedings of the 34th International Conference on Machine Learning, Sydney, Australia, 2017, JMLR: W&CP, Copyright 2017, pp. 1-12.
Pathak et al., "Zero-Shot Visual Imitation," Published as a Conference Paper at ICLR 2018, pp. 1-16.
Pong et al., "Skew-Fit: State-Covering Self-Supervised Reinforcement Learning," arXiv preprint arXiv:1903.03698, 2019, pp. 1-19.
Shannon et al., "Coding Theorems for a Discrete Source with a Fidelity Criterion," Institute of Radio Engineers, International Convention Record, vol. 7, 1959, pp. 325-350.
Tan et al., "Connecting the Dots Between MLE and RL for Sequence Generation," arXiv preprint arXiv:1811.09740, 2018, pp. 1-14.
Tucker et al., "The Mirage of Action-Dependent Baselines in Reinforcement Learning," Proceedings of the 35th International Conference on Machine Learning, vol. 80 of Proceedings of Machine Learning Research, pp. 5015-5024, Stockholmsmassan, Stockholm Sweden, Jul. 10-15, 2018. PMLR.
Wang et al., "Sample Efficient Actor-Critic with Experience Replay," Under Review as a Conference Paper at ICLR 2017, arXiv preprint arXiv: 1611.0122, 2016, pp. 1-20.
Wu et al., "Variance Reduction for Policy Gradient with Action-Dependent Factorized Baselines," in International Conference on Learning Representations, 2018, pp. 1-17.
Zoph et al., "Neural Architecture Search with Reinforcement Learning," Under Review as a Conference Paper at ICLR 2017, pp. 1-16.

\* cited by examiner

Algorithm 1 Efficient Credit Assignment with Learned Prior and Adaptive Weights

Require: Training data $\{(x_i, y_i)\}_{i=1}^{N}$, successful programs buffers $\{(B_i, B_i^e)\}_{i=1}^{N}$, and unsuccessful programs buffers $\{C_i\}_{i=1}^{N}$, moving average weight $\eta$, and thresholds $w_l$ and $w_u$.

repeat
   Initialize training batch $D \leftarrow \emptyset$
   Get a batch of inputs $F$
   for $(x_i, y_i, B_i^e, B_i, C_i) \in F$ do
     // Warm start buffer B
     Algorithm 2$(x_i, \pi_\theta^{old}, B_i^e, B_i)$
     Sample $x_i^+ \sim \pi_\theta^{old}$ over $B_i$
     $w_i \leftarrow \pi_\theta^{old}(B_i^e)$
     // Clip buffer probability
     $w_i^+ \leftarrow \max(w_i, w_l)$
     $w_i^+ \leftarrow \min(w_i^+, w_u)$
     // Adaptive weights based on off-policy samples
     $w_i' \leftarrow$ Algorithm 3$(x_i, \pi_\theta^{old}, B_i^e, B_i)$
     $w_i \leftarrow w_i * w_i'$
     $D \leftarrow D \cup (a_i^+, w_i^+)$
     Sample $z_i^- \sim \pi_\theta^{old}$ over $C_i$
     $w_i^- \leftarrow \rho_f(\pi_\theta^{old}(C_i)/\pi_\theta(C_i))$
     $D \leftarrow D \cup (z_i^-, w_i^-)$
   end for
   Push $D$ to training queue
until converge or early stop
repeat
   Get a batch $D$ from training queue
   for $(z_i, w_i) \in D$ do
     $d\theta \leftarrow d\theta + w_i \nabla \log \pi_\theta(z_i)$
   end for
   update $\theta$ using $d\theta$
   $\pi_\theta^{old} \leftarrow \pi_\theta$
until converge or early stop

FIG. 6

Algorithm 2 Systematic Exploration

Input: Training data $x$, policy $\pi_\theta$, fully explored sub-sequences $B^e$, high-reward sequences $B$
Initialize: empty sequence $z_{0:0}$
while true do
    $V = \{z_t \mid z_{0:t-1} \| a \notin B^e\}$
    if $V == \emptyset$ then
        $B^e \leftarrow B^e \cup z_{0:t-1}$
        break
    end if
    sample $z_t \sim \pi^V(a \mid z_{0:t-1})$
    $z_{0:t} \leftarrow z_{0:t-1} \| z_t$
    if $z_t ==$ EOS then
        if $R(z_{0:t}) = 1$ then
            $B \leftarrow B \cup z_{0:t}$
        end if
        $B^e \leftarrow B^e \cup z_{0:t}$
        break
    end if
end while

FIG. 7

Algorithm 3 Adaptive Weights

Input: Training data $x$, Policy $\pi_\theta(z \mid x)$, prior distribution $\pi(z)$, buffers $B$ and $C$.
Draw $\{z_i\}$ from buffers $B$ and $C$
Compute $\pi(z_i)$ with Algorithm 4.
Compute $w_i = \pi(z_i \mid x)/\pi(z_i)$
Return: $w(t) = \frac{1}{n}\sum_{i=1}^{n} \mathbb{I}(w_i \geq t)$

FIG. 8

Algorithm 4 Learned Prior

Input: Program $\{z_i\}$, Policy $\pi_\theta(z \mid x)$, prior distribution $\bar{\pi}(z)$, buffers $B$ and $C$.
For each $z_i$, draw $x$ from $B$ and $C$
Compute $\bar{\pi}(z) = \frac{1}{|D|} \sum_{(x,y) \sim D} \pi_\theta(z \mid x)$
// Soft update prior distribution
$\bar{\pi}(z) = \eta * \bar{\pi}(z) + (1 - \eta) * \pi_\theta(z \mid x)$

FIG. 9

| Rank | Player | County |
|---|---|---|
| 1 | Nicky English | Tipperary |
| 2 | Mark Corrigan | Offaly |
| 3 | Joe Hennessy | Kerry |
| 3 | Finbarr Delaney | Cork |
| 5 | Nicky English | Tipperary |
| 5 | Adrian Ronan | Kilkenny |
| 7 | Nicky English | Tipperary |

$x$ = "Which player ranked the most?"
$R(z)$ =
$\mathbb{I}(\text{Execute}(z) == \text{"Nicky English"})$

FIG. 10

| Dataset | WIKITABLEQUESTIONS | | | WIKISQL | | |
|---|---|---|---|---|---|---|
| Method | Val | Test | Improvement on MAPO | Val | Test | Improvement on MAPO |
| REINFORCE | < 10 | < 10 | - | < 10 | < 10 | - |
| IML | 39.4 ± 0.6 | 39.8 ± 0.4 | - | 69.3 ± 0.5 | 70.1 ± 0.2 | - |
| RAML | 35.4 ± 0.7 | 35.9 ± 0.6 | - | 57.5 ± 0.3 | 61.4 ± 0.2 | - |
| MML | 37.8 ± 0.7 | 39.7 ± 0.3 | - | 68.7 ± 0.2 | 70.7 ± 0.1 | - |
| MAPO | 42.3 ± 0.3 | 42.8 ± 0.3 | 0 | 71.9 ± 0.6 | 72.5 ± 0.1 | 0 |
| MAPOX | 42.5 ± 0.4 | 43.6 ± 0.4 | +0.8 | 74.1 ± 0.5 | 74.9 ± 0.3 | 0.8 |
| ECA w/o LP | 43.3 ± 0.4 | 43.9 ± 0.2 | +1.1 | 74.6 ± 0.3 | 74.8 ± 0.2 | +2.6 |
| ECA | 44.6 ± 0.3 | 44.3 ± 0.2 | +1.5 | 75.2 ± 0.3 | 75.9 ± 0.1 | +3.4 |

Table 1: Comparison to baselines and ablation study on WIKITABLEQUESTIONS and WIKISQL benchmarks.

| Method | E.S. | Val | Test |
|---|---|---|---|
| Pasupat & Liang (2015) | - | 37.0 | 37.1 |
| Zhang et al. (2017) | - | 40.4 | 43.7 |
| MAPO | 1 | 42.3 | 42.8 |
| MeRL | 1 | 44.1 | 43.2 |
| BoRL | 1 | 42.9 | 43.8 |
| ECA | 1 | 44.6 | 44.3 |
| MAPO (ensemble) | 10 | - | 46.3 |
| MeRL (ensemble) | 10 | - | 46.9/47.9 |
| ECA (ensemble) | 10 | - | 47.9 |

Table 2: Evaluation of ECA with state-of-the-art on WIKITABLEQUESTIONS datasets.

| Method | E.S. | Val | Test |
|---|---|---|---|
| Zhong et al. (2017) | - | 60.8 | 59.4 |
| McCann et al. (2018) | - | 82.0 | 81.4 |
| MAPO | 1 | 71.9 | 72.5 |
| MeRL | 1 | 74.9 | 74.8 |
| BoRL | 1 | 74.6 | 74.2 |
| ECA | 1 | 75.2 | 75.9 |
| MAPO (ensemble) | 10 | - | 74.9 |
| MeRL (ensemble) | 10 | - | 77.1 |
| ECA (ensemble) | 10 | - | 78.3 |

Table 3: Evaluation of ECA with state-of-the-art on WIKISQL datasets.

*FIG. 11*

| Query/Generated Programs | Comment |
| --- | --- |
| Query nu-1147: Which opponent of the kansas city chiefs in 1987 saw a total of more than 70,000 in attendance? MAPO: $r_0$ = (argmax all_rows r.attendance-number); $r_{out}$ = (hop $r_0$ r.opponent-string) ECA: $r_0$ = (filter$_>$ all_rows [70,000] r.attendance-number); $r_{out}$ = (hop $r_0$ r.opponent-string) | The program generated by MAPO leads to wrong answer, because it wrongly assume that the one with largest number of attendance number is the opponent of kansas city. Instead ECA captures the semantic meaning of the query and generates correct program. |
| Query nu-1167: Who was the first oldest living president? MAPO: $r_0$ = (first all_rows); $r_{out}$ = (hop $r_0$ r.president) ECA: $r_0$ = (filter_str_contain_any all_rows [oldest living president'] r.became_oldest_living_president-string); $r_{out}$ =(hop $r_0$ r.president-string) | MAPO gets correct answer by chance because it is spurious program. MAPO wrongly assumes the data is ordered, in contrast, ECA generates programs that capture underlying semantic information. |
| Query nu-3733: At least how many more people attended gamestrom 15 than gamestrom 13? MAPO: $r_0$ = (filter_str_contain_any all_rows [13] r.dates-string); $r_{out}$ = (hop $r_0$ r.attendance-number ) ECA: $r_0$ = (filter_str_contain_any all_rows [13] r.dates-string); $r_1$ = (filter_str_contain_any all_rows [13] r.dates-string); (diff $r_0$ $r_1$ r.attendance-number) | MAPO gets correct answer by chance because it is spurious program, MAPO wrongly assumes the data is ordered, in contrast, ECA generates programs that capture underlying semantic information. |

Table 4: Example of generated programs from models trained using MAPO and ECA on WikiTableQuestions

*FIG. 12*

EFFICIENT OFF-POLICY CREDIT ASSIGNMENT

RELATED APPLICATIONS

This application claims priority to U.S. Provisional Patent Application No. 62/813,937, filed Mar. 5, 2019, U.S. Provisional Patent Application No. 62/849,007 filed May 16, 2019, and U.S. Provisional Patent Application No. 62/852,258 filed May 23, 2019, each of which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to neural networks and deep learning models, and more specifically, to efficient off-policy credit assignment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Artificial intelligence, implemented with neural networks and deep learning models, has demonstrated great promise as a technique for automatically analyzing real-world information with human-like accuracy. In general, such neural network and deep learning models receive input information and make predictions based on the same, for example, to direct the action of an actor or agent. Neural networks and deep learning models can learn through a process of reinforcement learning, where feedback in the form of rewards is provided to the neural network or learning model. The rewards allow or enable the neural network or learning model to gauge or measure the success or failure of its actions. Learning with sparse rewards, however, can be very challenging for a neural network or deep learning model.

BRIEF DESCRIPTION OF THE DRAWINGS

FIG. 6 illustrates an algorithm for efficient credit assignment with learned prior and adaptive weights, according to some embodiments.

FIG. 7 illustrates an algorithm for systematic exploration, according to some embodiments.

FIG. 8 illustrates an algorithm for adaptive weights, according to some embodiments.

FIG. 9 illustrates an algorithm for learned prior, according to some embodiments.

FIG. 10 illustrates an example of a task, for which efficient off-policy credit assignment for reinforcement learning may be applied.

FIG. 11 illustrates example results of ECA models compared to other approaches, according to some embodiments.

FIG. 12 illustrates examples of programs generated from natural language queries using models trained with ECA or other approaches, according to some embodiments.

Figure 1:
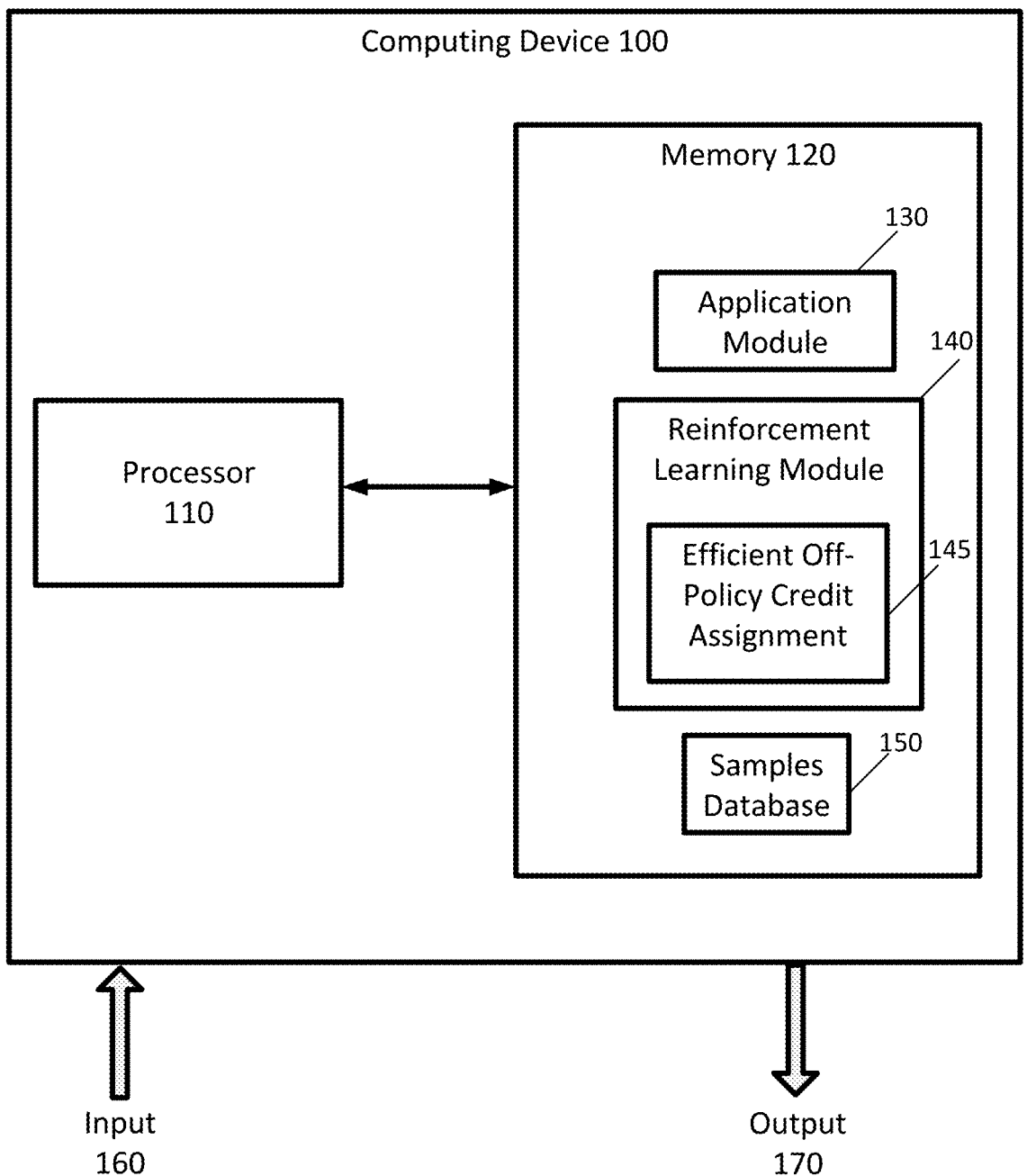
FIG. 1 is a simplified diagram of a computing device, according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Neural networks and deep learning models can learn, for example, through a process of reinforcement learning. Reinforcement learning attempts to model a complex probability distribution of rewards in relation to a large number of state-action pairs. In reinforcement learning, an agent or actor is run through sequences of state-action pairs. The neural network or model observes the rewards that result, and adapts or modifies its predictions to those rewards until it accurately predicts the best action for the agent to take based on the current state. A reward is the feedback a neural network or learning model receives in order to gauge or measure the success or failure of the agent's actions.

A policy is the strategy that the neural network or learning model employs to determine the agent's next action. In other words, a policy defines how the agent acts from a specific state. Every algorithm for reinforcement learning must follow some policy in order to decide which action(s) to perform at each state. A learning algorithm, or portion thereof, that takes into account the current policy is considered an on-policy learner. In contrast, an off-policy learner learns based on something other than the current policy.

Policy optimization can be used to improve the performance of a neural network or learning model, for example, in such settings or applications as robotic learning, program synthesis, architecture search, and conversational dialogue. Despite this, policy optimization still often suffers from the need to carefully shape reward function to guide the policy optimization, which means domain-specific knowledge is required. To mitigate the issue, there has been a recent surge of interest in developing policy optimization algorithms which can learn from a binary signal indicating successful task completion or other unshaped, sparse reward signals in various application domains, including sparse reward robotic control, and weakly-supervised semantic parsing. While utilizing off-policy samples could be helpful for learning, it remains a challenge to efficiently utilize off-policy samples, which leads to poor sample efficiency and hinders further application. It also remains unclear how existing credit assignment methods connect with each other.

According to some embodiments, the present disclosure provides systems and methods for efficient off-policy credit assignment (ECA) in reinforcement learning. ECA allows principled credit assignment for unsuccessful samples in deterministic environments with discrete actions, and therefore improves sample efficiency and asymptotic performance. One aspect, in some embodiments, is to formulate the optimization of expected return as approximate inference, where policy is trained to approximate a learned prior distribution. In this manner, off-policy samples can be utilized in deterministic environments to approximate the divergence, instead of only using the successful samples when doing policy gradient. This provides or leads to a higher sample efficiency. ECA can generalize previous credit assignment methods.

In some examples, ECA is used in the application of weakly-supervised semantic parsing and program synthesis from natural language, where no logical forms are available and only the final binary success or failure feedback is available as supervision. It is demonstrated that ECA in this context significantly outperforms other methods.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Computing Device

According to some embodiments, the systems of the present disclosure—including the various networks, models, and modules—can be implemented in one or more computing devices.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes an application module 130, a reinforcement learning module 140, and a samples database 150. The reinforcement learning module 140 includes an efficient off-policy credit assignment (ECA) module 145. In some examples, memory 120 may include non-transitory, tangible, machine readable media that includes executable code that when run by one or more processors (e.g., processor 110) may cause the one or more processors to perform the methods described in further detail herein. In some examples, application module 130, reinforcement learning module 140 and sample database 150 may be implemented using hardware, software, and/or a combination of hardware and software.

The application module 130 may implement or support an agent or actor that performs an application or task, such as, for example, semantic parsing and program synthesis from natural language. Semantic parsing or program synthesis—which is a form of natural language processing (NLP)—is the mapping from natural language utterances into executable programs. For the task or application performed or provided by application module 130, computing device 100 receives input data 160. For the application of semantic parsing, for example, the input data 140 may include natural language instructions text. The natural language instructions text may comprise one or more utterances or text in natural language form relating to functions, routines, or operations that are performed on a computer. In this case, application module 130 may implement or provide a semantic parser that can operate on or process the natural language instructions text to map or generate software code, routines, processes for programs that can be executed or run on a computer to perform the functions, routines, or operations. In some examples, semantic parser of application module 130 considers and maps a natural language instruction or question x to a structured query z in a programming language such as SQL, Python, or source codes. The software code, routines, or processes results generated by semantic parser of application module 130 are provided as output 170 from computing device 100.

In some examples, actor or agent of the application module 130 may be weakly supervised; that is, the module 130 does not receive substantial or significant training examples or feedback from human annotators to improve its output or results. Weakly supervised semantic parsing can be formulated as a reinforcement learning problem with sparse reward, where a model, called a policy it, generates a program based on the given context and query and receives a sparse feedback on whether the execution of the generated program gives a correct answer (i.e., a "successful" program), and the goal is to learn a policy 7C that maximizes the expected reward and generalizes to new contexts. Learning with sparse rewards in deterministic environments with discrete actions is challenging, and yet important in combinatorial optimization and semantic parsing.

Reinforcement learning module 140 provides or supports learning for application module 130, including to adjust or optimize policy π. To address the issue or problem of weak supervision, reinforcement learning module 145 provides or supports efficient off-policy credit assignment (ECA) in the process of reinforcement learning. Efficient off-policy credit assignment module 145 provides a principled way of utilizing off-policy samples, formulating the optimization of expected return as approximate inference, where policy is approximating a learned prior distribution. This improves sample efficiency and asymptotic performance. Efficient off-policy credit assignment leads to rigorously generalizing previous credit assignment methods. The efficient off-policy credit assignment approach encourages the model itself to cover target distribution and account for uncertainty. The effectiveness of the efficient off-policy credit assignment approach is demonstrated, in some examples, on weakly-supervised semantic parsing and program synthesis from natural language problems.

In some embodiments, in the example of sematic parsing, efficient off-policy credit assignment module 145 automatically assigns credit to both successful results (e.g., successful programs) and unsuccessful results (e.g., unsuccessful programs) of past experience based on divergence between the model distribution itself and optimal probability distribution on results. The prior results (both successful and unsuccessful) are experience learned prior (past experience), and considered off-policy because they do not necessarily relate or connect with the current policy of the neural network or model. Thus, embodiments of the present disclosure provide an efficient and principled way of using off-policy (past) experience. The results of past experience can be stored in and/or retrieved from the samples database 150. It is shown that the off-policy credit assignment module 145 both distinguishes incorrect results that coincidentally output the correct result and explores the large space effectively from sparse rewards.

In some embodiments, the efficient off-policy credit assignment approach or framework considers or implements reinforcement learning with entropy regularization. Entropy regularization is commonly used to improve policy optimization in reinforcement learning.

Example Application—Weakly-Supervised Semantic Parsing

Semantic parsing or program synthesis is the mapping from natural language utterances made by a human user into executable programs. Semantic parsing or program synthesis considers the problem of learning to map a natural language instruction or question x to a structured query z in a programming language such as, for example, SQL, Python, or other source code.

Other work on the statistical learning of semantic parsers utilized supervised learning, where pairs of language utterances and programs are provided to the parsers as training examples. However, supervised learning can be problematic in that it requires collecting training examples at scale from expert human annotators who are familiar with both programming languages and domain knowledge. This has led to a wide range of work on weakly-supervised semantic parsing.

According to some embodiments described herein, semantic parsing is considered in the weakly supervised setting, where there is no access to the ground-truth program during training and the model is required to learn from weak feedback or a sparse reward. That is, the only feedback is received at the end of the episode when the generated completed program is executed. And even then, the feedback is limited in scope, being simply an indicator or binary signal of whether the task has been completed successfully or unsuccessfully. It has been a challenge to effectively use both successful and unsuccessful past experience in order to improve semantic parsing, and the results obtained therefrom.

FIG. 10 illustrates an example of a semantic parsing task. In this example, an agent is presented with a context x that comprises a natural language question (e.g., "Which player ranked the most?") and a table (with a number of potential answers to the question). The agent is asked to generate a program $z=(z_1, z_2, \ldots, z_n)$. The agent receives a reward of 1 if execution of z on the relevant data table leads to the correct answer y (e.g., "Nicky English"). The model or agent needs to discover the programs that can generate the correct answer in a given context and generalizes over unseen context.

Reinforcement learning may be applied for the situation or case of weakly supervised semantic parsing. Weakly supervised semantic parsing can be formulated as a reinforcement learning problem with sparse reward, where a model, called policy, generates a program based on the given context and query and receives a sparse feedback on whether the execution of the generated program gives the correct answer. The goal of the agent is to learn a policy that maximizes the expected reward and generalizes to new contexts.

This problem can be formulated as a Markov decision process over the environment states $s \in S$ and agent actions (program generation) $z \in Z$, under an unknown dynamic environment which is defined by a transition probability T (s'|s, z). The agent's action at time step t ($z_t$) is selected by the conditional probability distribution $\pi(z_t|s_t)$ called policy. In some embodiments, an autoregressive model can be used as the policy, where state $s_t$ is based on natural language input and the previous t steps generation, $$\pi_\theta(z|x) = \Pi_{i=t}^{|z|} \pi(z_t|z_{<t}, x), \qquad (1)$$

where $z_{<t} = (z_1, \ldots, z_{t-1})$ denotes a prefix of the program z, $x \in X$ denotes the context which contains both a natural language input and an interpreter on which the program will be executed. And $\pi_\theta(z|x)$ satisfy $\forall z \in Z : \pi_\theta(z|x) \geq 0$ and $\Sigma_{z \in Z} \pi_\theta(z|x) = 1$. The reward function is sparse. For example, it is natural to define a binary reward that is 1 when the output equals the answer and 0 otherwise. This means the agent will only receive a reward 1 at the end of an episode if it successfully completes the task. Therefore, R(z) is evaluated by running the complete program z on an interpreter or a database F to see whether the program gives correct answer:

$$R(z) = \begin{cases} 1, & \text{if } F(z) = y \\ 0, & \text{otherwise} \end{cases} \quad (2)$$

In policy gradient methods, a set of candidate policies $\pi_\theta(z|x)$ parameterized by $\theta$ is considered. The optimal policy is obtained by maximizing the expected cumulative reward, where the objective is expressed as $$J(\theta) = \sum_{x \sim p(x)} \sum_z R(z)\pi_\theta(z|x) = \sum_{x \sim p(x)} \sum_z R(z)\prod_{i=t}^{|z|} \pi(z_t | z_{<t}, x) \quad (3)$$

where $\rho(x)$ denotes the distribution of x. A straightforward way to estimate Equation 3 is by sampling (x, y) from training dataset $D=\{(x_i,y_i)\}_{i=1}^N$. The gradient of Equation 3 can be calculated with REINFORCE (described in more detail in Williams, "Simple statistical gradient-following algorithms for connectionist reinforcement learning," *Machine Learning*, 8(3-4):229-256, (1992), which is incorporated by reference herein) and estimated using Monte Carlo samples.

$$\nabla_\theta J(\theta) = \sum_{(x,y) \sim D} \sum_z \nabla_\theta \log \pi_\theta(z|x) R(z), \quad (4)$$

Unfortunately, since the search space of programs is very large, most samples z have reward R(z)=0, and thus do not contribute to the gradient estimation in Equation 4. Besides, because the variance of score function estimators is very high, it is challenging to estimate the gradient in Equation 4 with a small number of successful programs. Previous methods have proposed to estimate gradient as a combination of expectations inside and outside successful programs buffer; however, those methods have been restricted to using successful programs only, and suffer from high sample complexity.

To mitigate or address this challenge, according to some embodiments, systems and methods of the present disclosure utilize both successful and unsuccessful programs in past experience.

Efficient Off-Policy Credit Assignment

According to some embodiments, systems and methods of the present disclosure provide or implement reinforcement learning, with an efficient off-policy credit assignment, for a neural network agent or model, such as used, for example, for semantic parsing in a weakly-supervised situation.

Figure 2:
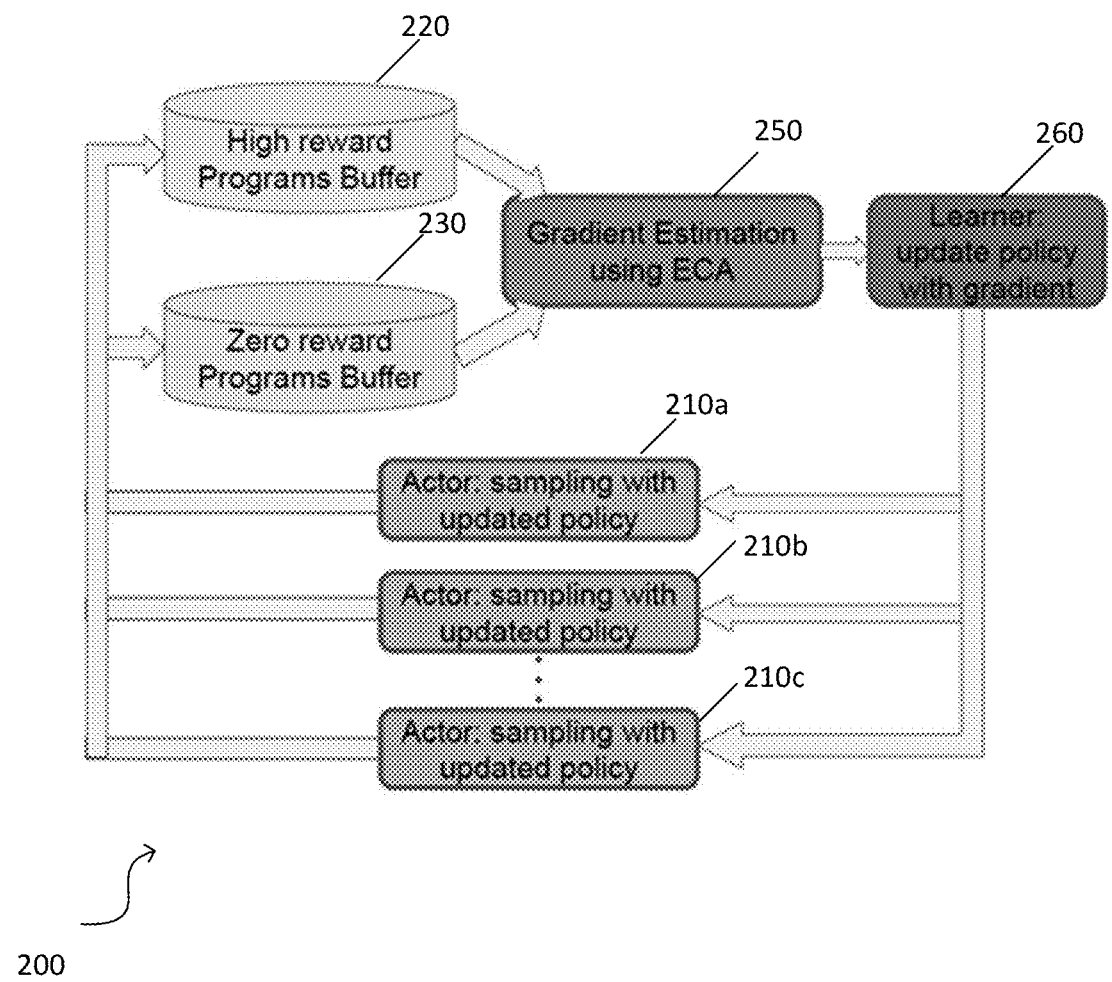
FIG. 2 is a simplified diagram of a framework for reinforcement learning with efficient off-policy credit assignment, according to some embodiments.

System:

A corresponding system or framework 200 for the algorithm or approach for reinforcement learning with efficient off-policy credit assignment, according to the present disclosure, is shown in FIG. 2. Framework 200 provides for efficient off-policy credit assignment, e.g., for weakly-supervised semantic parsing, according to some embodiments. This framework can be directly applied to combinatorial optimization, machine translation and other deterministic environments. In some embodiments, the framework 200 provides reinforcement learning for a neural network model or agent. In some examples, portions of framework 200 can be implemented in the computing device 100 as shown in FIG. 1.

In some embodiments, the framework 200 is implemented as an actor-learner model, where each of one or more actors 210a-c perform tasks or take actions based on one or more policies π, and reinforcement learning is applied so that the neural network model may learn from the experiences (both successful and unsuccessful) of the actors 210.

Each actor 210 can be an instance or implementation of the application module 130 (FIG. 1), performing the associated tasks or actions, such as semantic parsing. For this, the actor 210 may receive natural language instructions text as input data 160. In some examples, the natural language instructions text input 160 can be provided by a human operator, and may comprise one or more utterances or text in natural language form relating to functions, routines, or operations that are performed on a computer. Each actor 210 operates on the natural language instructions text input 160 to develop, derive, or generate predictions or results for executable program code. In some examples, each actor 210 (application module 130) uses natural language explanations text 145 to map or generate software code, routines, processes for programs that can be executed or run on a computer to perform the functions, routines, or operations. Some of the program code can be successful, while other program code is unsuccessful. Thus, the samples received from the one or more actors 210 can include both successful programs (where the generated code is appropriate for the natural language instruction text) and unsuccessful programs (where the generated code is not appropriate for the natural language instruction text).

The framework 200 includes one or more storage areas or buffers which, in some embodiments as shown, can include a high reward programs buffer 220 (buffer B) and a zero reward programs buffer 230 (buffer C). High reward programs buffer 220 may store samples of successful program results, for which a high reward should be assigned or given. Zero reward programs buffer 230 may store samples of unsuccessful program results, for which zero reward should be given. With reference to FIG. 1, these buffers 220, 230 can be included or implemented in sample database 150.

In some embodiments, the models or actors 210 may employ or implement a seq2seq model as $\pi_\theta(z|x)$, and two key-variable memory as successful programs buffer 220 (buffer B) and unsuccessful programs buffer 230 (buffer C), and may be associated with a domain-specific language interpreter (as described in more detail in Liang et al., "Neural symbolic machines: Learning semantic parsers on freebase with weak supervision," *In Proceedings of the 55th Annual Meeting of the Association for Computational Linguistics (Volume 1: Long Papers)*, pp. 23-33. Association for Computational Linguistics, 2017. doi: 10.18653/v1/P17-1003 (2017), incorporated by reference herein). In some examples, the code is based on open source implementation of Memory Augmented Policy Optimization (MAPO) which implements a distributed actor-learner architecture (as described in more detail in Espeholt et al., "Impala: Scalable distributed deep-rl with importance weighted actor-learner architectures," arXiv preprint arXiv:1802.01561, (2018), incorporated by reference herein) to accelerate sampling through distributed actors.

With reference to FIG. 2, the framework 200 also includes a gradient module 250 and a learner module 260. In some embodiments, one or both of the gradient estimation module 250 and learner module 260 can be implemented in or be part of off-policy credit assignment module 135 (FIG. 1). The gradient estimation module 250 generates or derives a general gradient estimation. According to some embodiments, the gradient estimation module 250 periodically estimates the gradient (as described below) using samples from buffers 210 and 220. The resulting gradient is a weighted sum of gradients estimated based on successful and unsuccessful programs in past experience. The weights depend on function $f$, the likelihood of samples under current policy and stratified sampling. It is demonstrated that this gradient estimation generalizes the previous methods in semantic parsing, such as MAPO, Maximize Marginal Likelihood (MML), Iterative Maximum Likelihood (IML), and Reward Augmented Likelihood (RAML), each of which can be reduced through some particular choice of function $f$ and weights. Based on the gradient estimation, the learner module 260 updates the policy $\pi$ for the neural network or model. In this way, reinforcement learning is provided or implemented for the application module 130 (FIG. 1).

Figure 3:
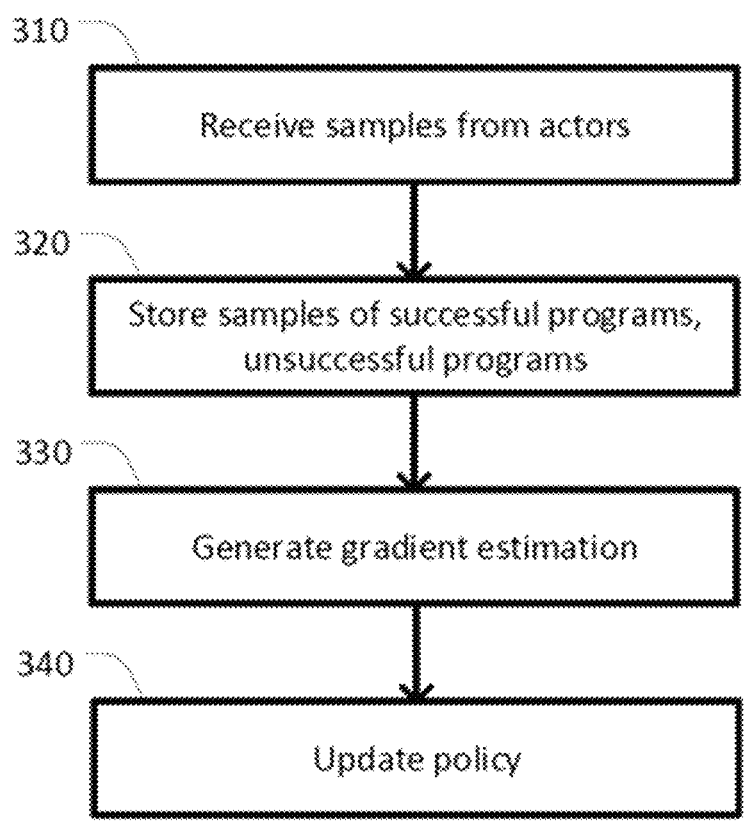
FIG. 3 is a simplified diagram of a method for reinforcement learning with efficient off-policy credit assignment, according to some embodiments.

Method:

FIG. 3 is a corresponding method 300 for the system or framework 200 of FIG. 2, according to some embodiments. One or more of the processes 310-340 of method 300 may be implemented, at least in part, in the form of executable code stored on non-transitory, tangible, machine-readable media that when run by one or more processors (e.g., processor 110) may cause the one or more processors to perform one or more of the processes 310-340. In some embodiments, method 300 may correspond to the method used or performed by off-policy credit assignment module 145 for reinforcement learning of application module 130.

At a process 310, samples of results may be received from one or more actors 230 (e.g., implementing application module 130). These samples can be, for example, software code, routines, or processes for one or more executable programs generated or output by the semantic parser of application module 130. Each of these samples can be either successful (e.g., the generated program yields the correct results) or unsuccessful (e.g., the generated program yields wrong results).

At a process 320, the samples of successful programs and unsuccessful programs are stored in memory. In some examples, samples of successful programs are stored into high reward programs buffer 220 (buffer B), and samples of unsuccessful programs are stored into zero reward programs buffer 230 (buffer C). Both successful and unsuccessful samples of prior experience can be used for reinforcement learning of the model for application module 130.

At a process 330, the gradient estimation module 250 of the framework 200 periodically estimates a gradient based on the samples of successful programs and unsuccessful programs (stored in buffers 220 and 230). Gradient estimation module 250 applies the efficient off-policy credit assignment (ECA) of the present disclosure which, in some embodiment, generates a general gradient estimate based on weighted samples from the past experience. The generation of this gradient estimate is described below in more detail. The gradient estimation generalizes previous methods and empirically demonstrate its effectiveness in semantic parsing.

At a process 340, using the gradient estimate generated by module 250, the learner module 260 updates the policy for the neural network model or actor, as further described herein.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Entropy Regularized Reinforcement Learning:

In some embodiments, the algorithm or approach of the present disclosure utilizes or employs an entropy regularization term to encourage exploration. In this approach, entropy regularization is cast as a general inference problem, where policy distribution is learned to approximate a prior distribution under a certain divergence measure. In some examples, the prior distribution can be optimized to guide the approximate inference.

A more general maximum entropy objective favors stochastic policies by augmenting the objective with the relative entropy of the policy, $$J(\theta) = \sum_{(x,y) \sim D} \sum_z \pi_\theta(z|x) R(z) + \lambda H(\pi_\theta(z|x); \bar{\pi}(z)), \quad (5)$$

where $\lambda$ is a regularization weight, H ($\pi\theta(z|x)$; $\dot{\pi}(z)$) is the relative entropy regularization term between policy $\pi_\theta(z|x)$ and prior distribution $\bar{\pi}(z)$. The summation over $(x, y) \sim D$ is omitted for notation simplicity in the remainder of this description.

Lemma 1. Equation 5 is equivalent to minimizing the following objective, $$L(\theta) = \sum_z \lambda D_{KL}(\pi_\theta(z|x) \| \bar{\pi}(z)), \bar{\pi}(z) = \exp\left(\frac{1}{\lambda}(R(z) - V(x))\right) \quad (6)$$

V $(x) = \lambda \log \int_z \exp(R(z)/\lambda)$ is a "soft-version" of value function, serving as a normalization constant here. From Equation 6, the distribution $\bar{\pi}(z)$ is approximated with a simpler distribution from a family $\{\pi_\theta(z|x):\theta \in \Theta\}$, where $\theta$ is the parameter that we want to optimize, and $\pi_\theta(z|x)$ is represented as an autoregressive policy in Equation 1.

Learned Prior Distribution:

According to some embodiments, prior distribution is learned in order to optimize Equation 3. The learned prior distribution, in some embodiments, can be considered or serve as an initial estimate. The goal or objective is that entropy regularization encourages the policy to be similar to a non-uniform distribution $\bar{\pi}(z)$, which assigns higher probability mass to more important programs. Basically, this is equivalent to $\min_{\bar{\pi}(z)}$ $$\sum_{(z,y) \sim D} \frac{1}{|D|} D_{KL}(\pi_\theta(z|x) \| \bar{\pi}(z)),$$

Proposition 1. Given a policy $\pi_\theta(z|x)$, new prior distribution $\bar{\pi}(z)$ should be updated as, $$\bar{\pi}(z) = \frac{1}{|D|} \sum_{(x,y) \sim D} \pi_\theta(z|x). \quad (7)$$

and substituting Equation 7 into Equation 6 leads to a mutual information regularization, $$\frac{1}{|D|} \sum_{(x,y) \sim D} D_{KL}(\pi_\theta(z|x) \| \bar{\pi}(z)) = I(x; z) \qquad (8)$$

Proposition 1 states that optimizing $\bar{\pi}(z)$ is equivalent to mutual information regularization. Alternatively, optimizing $\pi_\theta(z|x)$ and $\bar{\pi}(z)$ leads to a complex mixture distribution of $\bar{\pi}(z)$, increasing the expressive power of prior distribution for credit assignment. Therefore, the optimization of Equation 3 becomes or results in maximizing mutual-information-regularized expected reward given by, $$J(\theta) = \sum_{(x,y) \sim D} \sum_z \pi_\theta(z|x) R(z) - \lambda I(x; z), \qquad (9)$$

Equation 9 draws connection with rate distortion theory (as described in more detail, for example, in Shannon, "Coding theorems for a discrete source with a fidelity criterion," *IRE Nat. Conv. Rec,* 4 (142-163):1 (1959), and Cover et al., *Elements of information theory*, John Wiley-Sons (2012), both of which are incorporated by reference herein); intuitively, the policy $\pi_\theta(z|x)$ is encouraged to discard reward-irrelevant information in context x subject to a limited channel capacity given by I (x; z). This has been observed in the widely-used Maximize Marginal Likelihood (MML) method. The objective is to maximize $J_{MML}$ with respect to $\theta$, $J_{MML}$=log $\Sigma_{z \sim \pi_\theta(z|x)}\pi_\theta(x|x)R(z)$. The gradients of $J_{MML}$ have the form, $$\nabla_\theta J_{MML} = \sum_{z \sim \pi_\theta(z|x)} w(z) \nabla_\theta \log \pi_\theta(z|x) R(z), \qquad (10)$$

$$\text{where } w(z) = \frac{R(z)\pi_\theta(z|x)}{\sum_{\tilde{z}} R(\tilde{z})\pi_\theta(z'|x)},$$

The weight w(z) (associated or related with the credit given for samples) is basically a "normalized" likelihood of $\pi_\theta(z|x)$ on program space Z. An algorithm (Algorithm 3) for generating the adaptive weights or credits for successful (high reward) and unsuccessful (zero reward) sample or programs is illustrated in FIG. 8. Theorem 1 shows that an information theoretical prior may be a similar "normalized" likelihood of $\pi_\theta(z|x)$ on context space X. More empirical findings on this are described below. To stabilize the algorithm, the prior distribution is gradually changed according to the following equation, $$\bar{\pi}(z) = \eta * \bar{\pi}(z) + (1-\eta) * \pi_\theta(z|x), \qquad (11)$$

where $\eta$ is a changing rate in [0,1]. The algorithm will alternatively learn policy distribution $\pi_\theta(z|x)$ with Equation 6 and update prior distribution $\bar{\pi}(z)$ with Equation 11. How to learn $\pi_\theta(z|x)$ with Equation 6 is described next.

Further details for the learned prior distribution $\bar{\pi}(z)$ are provided in the algorithm (Algorithm 4) illustrated in FIG. 9, according to some embodiments.

General Gradient Estimation:

While $D_{KL}$ ($\pi_\theta(z|x) \| \bar{\pi}(z)$) is the typical divergence measure widely used in variational inference, natural language processing and reinforcement learning, it often leads to model collapse because of its mode-seeking property. Therefore, directly optimizing Equation 6 often gives a suboptimal model $\pi_\theta(z|x)$. Alternative divergence measures may therefore be considered. In some embodiments, the systems and methods of the present disclosure approach this problem by minimizing the general $f$-divergence between $\bar{\pi}(z)$ and $\pi_\theta(z|x)$. $f$-divergence includes a large spectrum of divergences (e.g., KL and reverse KL divergence) and is shown to be powerful in various settings, $$D_F(\bar{\pi}(z) \| \pi_\theta(z|x)) = \mathbb{E}_{z \sim \pi_\theta(z|x)}\left[ f\left(\frac{\bar{\pi}(z)}{\pi_\theta(z|x)}\right) - f(1)\right], \qquad (12)$$

where $f: \mathbb{R}_+ \to \mathbb{R}$ is any twice-differentiable convex function. It can be shown by Jensen's inequality that $D_F$ (p||q)≥0 for any p and q. Further, if $f$(t) is strictly convex at t=1, then $D_F$ ($\bar{\pi}(z)\|\pi_\theta(z|x)$)=0 implies $\bar{\pi}(z)=\pi_\theta(z|x)$. In some embodiments, stochastic optimization can be used to minimize Equation 12, and the then gradient of Equation 12 is given by:

Lemma 2. Assume f is a differentiable convex function and log $\pi_\theta(z|x)$ is differentiable with respect to $\theta$. For f-divergence defined in equation 12, we have $$\nabla_\theta D_F(\bar{\pi}(z) \| \pi_\theta(z|x)) = -\mathbb{E}_{z \sim \pi_\theta(z|x)}\left[\rho_f\left(\frac{\pi_\theta(z|x)}{\bar{\pi}(z)}\right) \nabla_\theta \log \pi_\theta(z|x)\right], \qquad (13)$$

where $\eta_f(t)=f'(t)t-f(t)$.

Equation 13 shows that the gradient of $f$-divergence between ($\pi_\theta(z|x)$) and $\bar{\pi}(z)$ can be specified through $\rho_f$ or f. Note that here z can be both successful or unsuccessful samples (e.g., programs), taking advantage of the fact that the search spaces of programs are enumerable and deterministic.

Algorithm or Approach for Gradient Estimation:

According to embodiments of the present disclosure, samples of both successful or unsuccessful programs (from which learned prior distribution can be generated or calculated) can be used to estimate this gradient, thus providing an approach for efficient off-policy credit assignment for reinforcement learning. In some embodiments, the approach optimizes the prior distribution to guide the approximate inference.

Proposition 2. An unbiased and low variance estimation of Equation 13 is given by $$\nabla_\theta \hat{D}_F(\bar{\pi}(z) \| \pi_\theta(z|x)) = w \sum_{z \sim \pi_\theta^+(z|x)} \rho_f\left(\frac{\pi_\theta(z|x)}{\bar{\pi}(z)}\right) \nabla_\theta \log \pi_\theta(z|x) + \qquad (14)$$
$$(1-w) \sum_{z \sim \pi_\theta^-(z|x)} \rho_f\left(\frac{\pi_\theta(z|x)}{\bar{\pi}(z)}\right) \nabla_\theta \log \pi_\theta(z|x)$$

where $$\pi_\theta^+(z|x) = \begin{cases} \pi_\theta(z|x)/w & \text{if } z \in B \\ 0 & \text{if } z \notin B \end{cases}, \pi_\theta^-(z|x) = \begin{cases} 0 & \text{if } z \in B \\ \pi_\theta(z|x)/(1-w) & \text{if } z \notin B \end{cases} \qquad (15)$$

Figure 4:
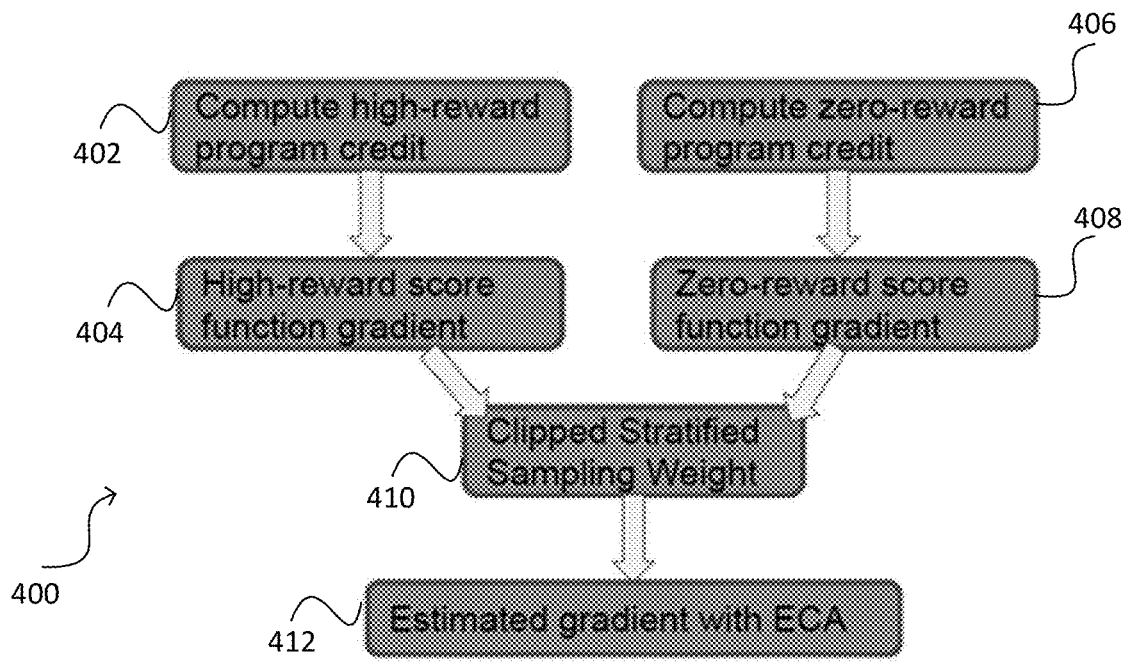
FIG. 4 is a simplified diagram of a method for gradient estimation, according to some embodiments.

This generates the gradient estimation according to embodiments of the present disclosure, as further explained with reference to FIG. 4. FIG. 4 is a simplified diagram of a method 400 for gradient estimation. In some embodiments, method 400 can be performed or implemented by gradient estimation module 250 (FIG. 2).

At a process 402, using samples of successful programs (e.g., obtained or retrieved from high reward programs buffer 220, or buffer B), module 250 computes a high-reward program credit, and at a process 404, module 250 generates a high-reward score function gradient:

$$\sum_{z \sim \pi_\theta^+(z|x)} \rho_f\left(\frac{\pi_\theta(z|x)}{\overline{\pi}(z)}\right) \nabla_\theta \log \pi_\theta(z|x)$$

At a process 406, using samples of unsuccessful programs (e.g., obtained or retrieved from zero reward programs buffer 230, or buffer C), module 250 computes a zero-reward program credit, and at a process 408, module 250 generates a zero-reward score function gradient:

$$\sum_{z \sim \pi_\theta^-(z|x)} \rho_f\left(\frac{\pi_\theta(z|x)}{\overline{\pi}(z)}\right) \nabla_\theta \log \pi_\theta(z|x)$$

At a process 410, module 250 generates and applies clipped stratified sampling weights w to the high-reward score function gradient and the zero-reward score function gradient. The weighted function gradients are added together at a process 412 to give a gradient estimation with efficient off-policy credit assignment. This gradient estimation uses successful trajectories, thus no (z|x) will not forget them. The gradient estimation also uses unsuccessful trajectories in the past, which improves sample efficiency and leads to a better approximation.

Further details for gradient estimation, for example, as implemented by gradient estimation module 250 of the framework 200, are provided in FIGS. 6-8. FIG. 6 illustrates the algorithm (Algorithm 1) for efficient credit assignment with learned prior and adaptive weights, according to some embodiments. FIG. 7 illustrates an algorithm (Algorithm 2) which may be employed in Algorithm 1 for systematic exploration to enforce a policy to take actions that lead to unexplored sequences. FIG. 8 illustrates an algorithm (Algorithm 3) for generating or deriving the adaptive weights related to off-policy samples.

Figure 5:
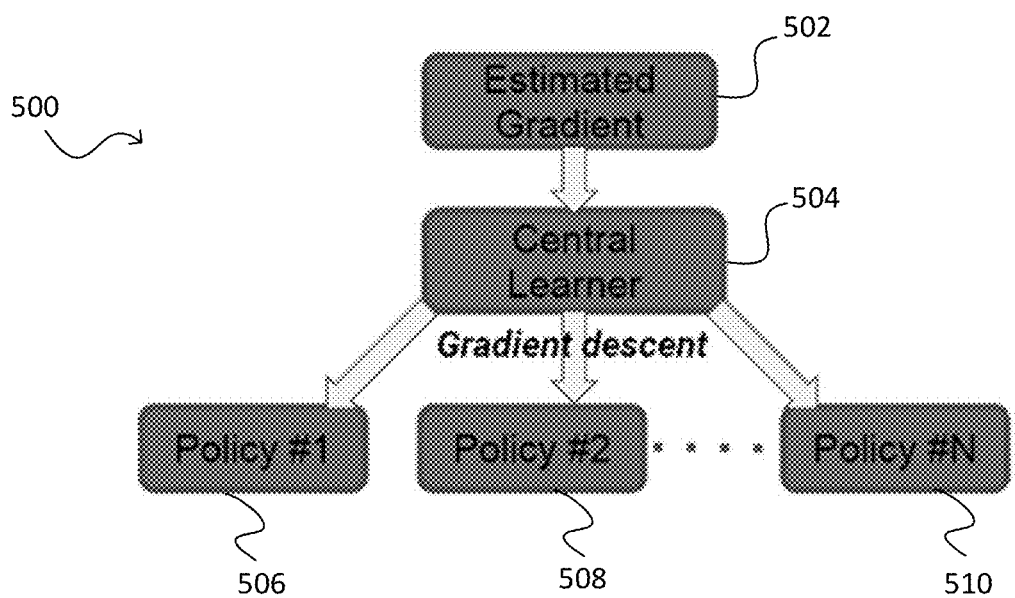
FIG. 5 is a simplified diagram of a method for updating policy, according to some embodiments.

The gradient estimation generated by gradient estimation module 250 may be used for updating policy π of the neural network or model. FIG. 5 is a simplified diagram of a method 500 for updating policy, according to some embodiments. In some embodiments, method 500 can be performed or implemented by learner module 260 (FIG. 2).

At a process 502, learner module 260 receives or obtains the gradient estimation from gradient estimation module 250. At process 504, learner module 260 implements aspects of a central learner, as described in more detail in Espeholt et al., 2018, which is incorporated by reference herein. At processes 506, 508, and 510, the learner module 260 updates one or more policies (e.g., policies #1, #2, # N) for the neural network model.

According to some embodiments, related to gradient estimation, the systems and methods of the present disclosure minimize the general f-divergence. In choosing f-divergence such that it achieves a good exploration and exploitation trade-off, some embodiments follow the approach as described in Wang et al., "Variational inference with tail-adaptive f-divergence," *Advances in Neural Information Processing Systems*, pp. 5742-5752 (2018), which is incorporated herein by reference. Specifically, let $\{z_i\}$ be drawn from buffers B and C and $w_i = \pi(z_i|x)/\overline{\pi}(z_i)$. Substitute $\rho_f(\pi_\theta(z|x)/\overline{\pi}(z))$ with the inverse of approximate tail probability given by $$w(t) = \frac{1}{n}\sum_{i=1}^{n} \Pi(w_i \geq t),$$

the corresponding algorithm for adaptive weights is summarized in Algorithm 3, as shown in FIG. 8, which incorporates learned prior Algorithm 4, as shown in FIG. 9. In some examples, to overcome cold start problem in sparse reward policy gradient, the systems and methods clip w to a given range (for example, as described in more detail in Liang et al., "Learning dependency-based compositional semantics. Computational Linguistics," 39(2):389-446 (2018), incorporated by reference herein) such that w=max (w, w$_l$) and w=min (w, w$_u$) where w$_l$≤w$_u$.

Equation 14 generalizes previous work in semantic parsing, including MML, MAPO, RAML, and IML, where different methods correspond to different choices for the way of credit assignment.

Training and Experiments

In some examples, the neural networks or models of the present disclosure can be trained or evaluated with datasets, such as the weakly-supervised semantic parsing benchmarks WIKITABLEQUESTIONS and WIKISQL. The WIKITABLEQUESTIONS dataset (which is described in more detail in Pasupat et al., "Compositional semantic parsing on semi-structured tables," In *Proceedings of the 53rd Annual Meeting of the Association for Computational Linguistics and the 7th International Joint Conference on Natural Language Processing* (Volume 1: Long Papers), pp. 1470-1480. Association for Computational Linguistics (2015) doi: 10.3115/v1/P15-1142, incorporated by reference herein) contains 2,108 tables and 18,496 question-answer pairs built from tables extracted from Wikipedia. WIKISQL—which is described in more detail in Zhong et al., 2017 incorporated by reference herein—is a recent large scale dataset on learning natural language interfaces for databases. It contains 24,241 tables extracted from Wikipedia and 80,654 question-program pairs. It is annotated with programs (SQL). In both datasets, question-answers are split into train, evaluation, and test sets. In some examples, the question-answer pairs of the datasets are used for weakly supervised training.

In some embodiments, the construction (as described in Pasupat et al. (2015), referenced above) is followed for converting a table into a directed graph that can be queried. The rows and cells of the table are converted to graph nodes while column names become labeled directed edges. In some embodiments, at the beginning of training, a policy with random initialization will assign small probabilities to the successful programs. This causes them to be ignored during gradient estimation performed by gradient estimation model or module 250. To overcome cold start problem in sparse reward policy gradient, the probability of programs in buffer B are clipped as discussed above. In some embodiments, the systems and methods of the present disclosure use systematic exploration, for example, according to Algorithm 2 as shown in FIG. 6, to enforce a policy to take actions that lead to unexplored sequences.

In some embodiments, the Adam Optimizer (as described in more detail in Kingma et al., "A method for stochastic optimization," arXiv preprint 368 arXiv:1412.6980 (2014), which is incorporated by reference herein) is used for experiments and training. Memory weight clipping is 0:1. In some embodiments, for training of the models hyper-parameter sweeps can be performed via random search, for example, over the interval ($10^{-4}$, $10^{-2}$) for learning rate and the interval ($10^{-4}$, $10^{-1}$) for entropy regularization. All the hyperparameters may be tuned on the evaluation set.

Results

Results on the systems and methods employing efficient off-policy credit assignment (ECA) for reinforcement learning are presented, and may be compared against other methods or approaches for weakly-supervised semantic parsing, such as REINFORCE, MML, IML MAPO, and RAML, as seen in the tables of FIG. 11.

Table 1 of FIG. 11 shows results on both WIKITABLE-QUESTIONS and WIKISQL benchmarks, for the various approaches. It can be seen in FIG. 11 that ECA noticeably improves upon previous methods in terms of both sample efficiency and asymptotic performance significantly by performing better credit assignment. The comparison shows that both adaptive weight and learned prior (LP) leads to significant improvement.

Table 2 and Table 3 present the results on weakly-supervised semantic parsing. ECA outperforms previous approaches or methods for weakly supervised semantic parsing. Table 2 and Table 3 show that the improvement is significant as the results are averaged across 5 trials. These results demonstrate the efficacy of the ECA compared to previous credit assignment methods.

FIG. 12 illustrates examples of programs generated from natural language queries in WIKITABLE-QUESTIONS using models trained with ECA or MAPO. FIG. 12 shows that, in some examples, ECA is capable of generating correct programs that capture the meaning of the natural language queries while MAPO generates either wrong answer programs or spurious programs.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for efficient off-policy credit assignment in reinforcement learning, the method comprising:

receiving, via a communication interface, a training dataset comprising a plurality of contexts and sample results generated from one or more agents implementing one or more actions, wherein the one or more actions are generated by a learning model according to one or more policies that are unrelated to a current policy in response to a context from the plurality of contexts, wherein the received sample results comprise a successful sample result resulting in a high reward for the one or more agents, and an unsuccessful sample result resulting in a low reward for the one or more agents;

computing, via a processor, a learned prior distribution of the one or more actions based on an average of the one or more policies that generate the one or more actions over the training dataset;

computing one or more adaptive weights of samples based at least in part on the learned prior distribution and the received sample results including both the successful sample result and the unsuccessful sample result;

generating an estimate of a gradient using the one or more adaptive weights; and training the learning model by updating the current policy using the estimate of the gradient.

2. The method of claim 1, wherein computing one or more adaptive weights comprises generating at least one of a high-reward result credit and a zero-reward result credit.

3. The method of claim 2, wherein generating an estimate of a gradient comprises generating a high-reward score function gradient using the high-reward result credit to weight successful sample results.

4. The method of claim 2, wherein generating an estimate of a gradient comprises generating a zero-reward score function gradient using the zero-reward result credit to weight unsuccessful sample results.

5. The method of claim 1, wherein the learning model is applied to a task of semantic parsing.

6. The method of claim 5, wherein the sample results correspond to executable software code generated by the learning model based on natural language instructions text.

7. A system for efficient off-policy credit assignment in reinforcement learning, the system comprising:

a memory storing machine executable code; and one or more processors coupled to the memory and configurable to execute the machine executable code to cause the one or more processors to:

receive a training dataset comprising a plurality of contexts and sample results generated from one or more agents implementing one or more actions, wherein the one or more actions are generated by a learning model according to one or more policies that are unrelated to a current policy in response to a context from the plurality of contexts, wherein the received sample results comprise a successful sample result resulting in a high reward for the one or more agents, and an unsuccessful sample result resulting in a low reward for the one or more agents;

compute a learned prior distribution of the one or more actions based on an average of the one or more policies that generate the one or more actions over the training dataset;

compute one or more adaptive weights of samples based at least in part on the learned prior distribution and the received sample results including both the successful sample result and the unsuccessful sample result;

generate an estimate of a gradient using the one or more adaptive weights; and train the learning model by updating the current policy using the estimate of the gradient.

8. The system of claim 7, wherein the one or more processors are configurable to generate at least one of a high-reward result credit and a zero-reward result credit.

9. The system of claim 8, wherein the one or more processors are configurable to generate a high-reward score function gradient using the high-reward result credit to weight successful sample results.

10. The system of claim 8, wherein the one or more processors are configurable to generate a zero-reward score function gradient using the zero-reward result credit to weight unsuccessful sample results.

11. The system of claim 7, wherein the learning model is applied to a task of semantic parsing.

12. The system of claim 11, wherein the sample results correspond to executable software code generated by the learning model based on natural language instructions text.

13. A non-transitory machine-readable medium comprising executable code which when executed by one or more processors associated with a computer are adapted to cause the one or more processors to perform a method for efficient off-policy credit assignment in reinforcement learning, the method comprising:

receiving a training dataset comprising a plurality of contexts and sample results generated from one or more agents implementing one or more actions, wherein the one or more actions are generated by a learning model according to one or more policies that are unrelated to a current policy in response to a context from the plurality of contexts, wherein the received sample results comprise a successful sample result resulting in a high reward for the one or more agents, and an unsuccessful sample result resulting in a low reward for the one or more agents;

computing a learned prior distribution of the one or more actions based on an average of the one or more policies that generate the one or more actions over the training dataset;

computing one or more adaptive weights of samples based at least in part on the learned prior distribution and the received sample results including both the successful sample result and the unsuccessful sample result;

generating an estimate of a gradient using the one or more adaptive weights; and training the learning model by updating the current policy using the estimate of the gradient.

14. The non-transitory machine-readable medium of claim 13, wherein computing one or more adaptive weights comprises generating at least one of a high-reward result credit and a zero-reward result credit.

15. The non-transitory machine-readable medium of claim 14, wherein generating an estimate of a gradient comprises generating a high-reward score function gradient using the high-reward result credit to weight successful sample results.

16. The non-transitory machine-readable medium of claim 14, wherein generating an estimate of a gradient comprises generating a zero-reward score function gradient using the zero-reward result credit to weight unsuccessful sample results.

17. The non-transitory machine-readable medium of claim 13, wherein the learning model is applied to a task of semantic parsing.

18. The non-transitory machine-readable medium of claim 17, wherein the sample results correspond to executable software code generated by the learning model based on natural language instructions text.

* * * * *